(12) United States Patent
Simmonds

(10) Patent No.: US 11,639,772 B1
(45) Date of Patent: May 2, 2023

(54) ENGINE OIL COLLECTION CONTAINER

(71) Applicant: Damion Simmonds, Decatur, GA (US)

(72) Inventor: Damion Simmonds, Decatur, GA (US)

(*) Notice: Subject to any disclaimer, the term of this patent is extended or adjusted under 35 U.S.C. 154(b) by 293 days.

(21) Appl. No.: 17/158,111

(22) Filed: Jan. 26, 2021

(51) Int. Cl.
  *F16N 31/00* (2006.01)
  *B65D 25/10* (2006.01)
  *B65D 25/20* (2006.01)

(52) U.S. Cl.
  CPC ......... F16N 31/004 (2013.01); B65D 25/108 (2013.01); B65D 25/20 (2013.01)

(58) Field of Classification Search
  CPC ...... F16N 31/004; F16N 31/00; F16N 31/002; F16N 31/006; F16N 31/02; B65D 25/108; B65D 25/20
  See application file for complete search history.

(56) References Cited

U.S. PATENT DOCUMENTS

| | | | |
|---|---|---|---|
| 4,832,095 A | 5/1989 | Bonnell | |
| 5,269,354 A * | 12/1993 | Koberg | F16N 33/00 141/332 |
| 5,291,921 A | 3/1994 | Devine | |
| D360,214 S * | 7/1995 | Loudon | D15/150 |
| 5,477,897 A * | 12/1995 | Scofield | B09B 3/00 141/105 |
| 5,505,295 A | 4/1996 | Whittington | |
| 5,540,264 A | 7/1996 | Harp | |
| 7,040,357 B1 | 5/2006 | Volkers | |
| 9,464,757 B2 | 10/2016 | Allen | |

FOREIGN PATENT DOCUMENTS

WO  8909362  10/1989

* cited by examiner

*Primary Examiner* — Jacob M Amick
(74) *Attorney, Agent, or Firm* — Kyle A. Fletcher, Esq.

(57) ABSTRACT

The engine oil collection container comprises a collection pan and a perforated cover. The engine oil collection container may be a container for collecting oil. One or more emptied oil bottles may be held in an inverted position by a plurality of bottle apertures located on the perforated cover so that residual oil within the one or more emptied oil bottles may drain into the collection pan. A top aperture located at the top center of the perforated cover may be operable to collect the oil from a non-bottled oil source. As a non-limiting example, the non-bottled oil source may be an oil collection basin or a vehicle oil pan. In some embodiments, the engine oil collection container may comprise a rolling stand that is operable to reduce friction between the bottom of the collection pan and the ground when moving the container.

20 Claims, 5 Drawing Sheets

ENGINE OIL COLLECTION CONTAINER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of containers and automotive service tools, more specifically, an engine oil collection container.

SUMMARY OF INVENTION

The engine oil collection container comprises a collection pan and a perforated cover. The engine oil collection container may be a container for collecting oil. One or more emptied oil bottles may be held in an inverted position by a plurality of bottle apertures located on the perforated cover so that residual oil within the one or more emptied oil bottles may drain into the collection pan. A top aperture located at the top center of the perforated cover may be operable to collect the oil from a non-bottled oil source. As a non-limiting example, the non-bottled oil source may be an oil collection basin or a vehicle oil pan. In some embodiments, the engine oil collection container may comprise a rolling stand that is operable to reduce friction between the bottom of the collection pan and the ground when moving the container.

An object of the invention is to collect residual oil from one or more emptied oil bottles.

Another object of the invention is to collect the residual oil in a collection pan.

A further object of the invention is to provide a top aperture in the cover to collect oil from a non-bottled oil source.

Yet another object of the invention is to provide a rolling stand to assist in moving the container.

These together with additional objects, features and advantages of the engine oil collection container will be readily apparent to those of ordinary skill in the art upon reading the following detailed description of the presently preferred, but nonetheless illustrative, embodiments when taken in conjunction with the accompanying drawings.

In this respect, before explaining the current embodiments of the engine oil collection container in detail, it is to be understood that the engine oil collection container is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the engine oil collection container.

It is therefore important that the claims be regarded as including such equivalent construction insofar as they do not depart from the spirit and scope of the engine oil collection container. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
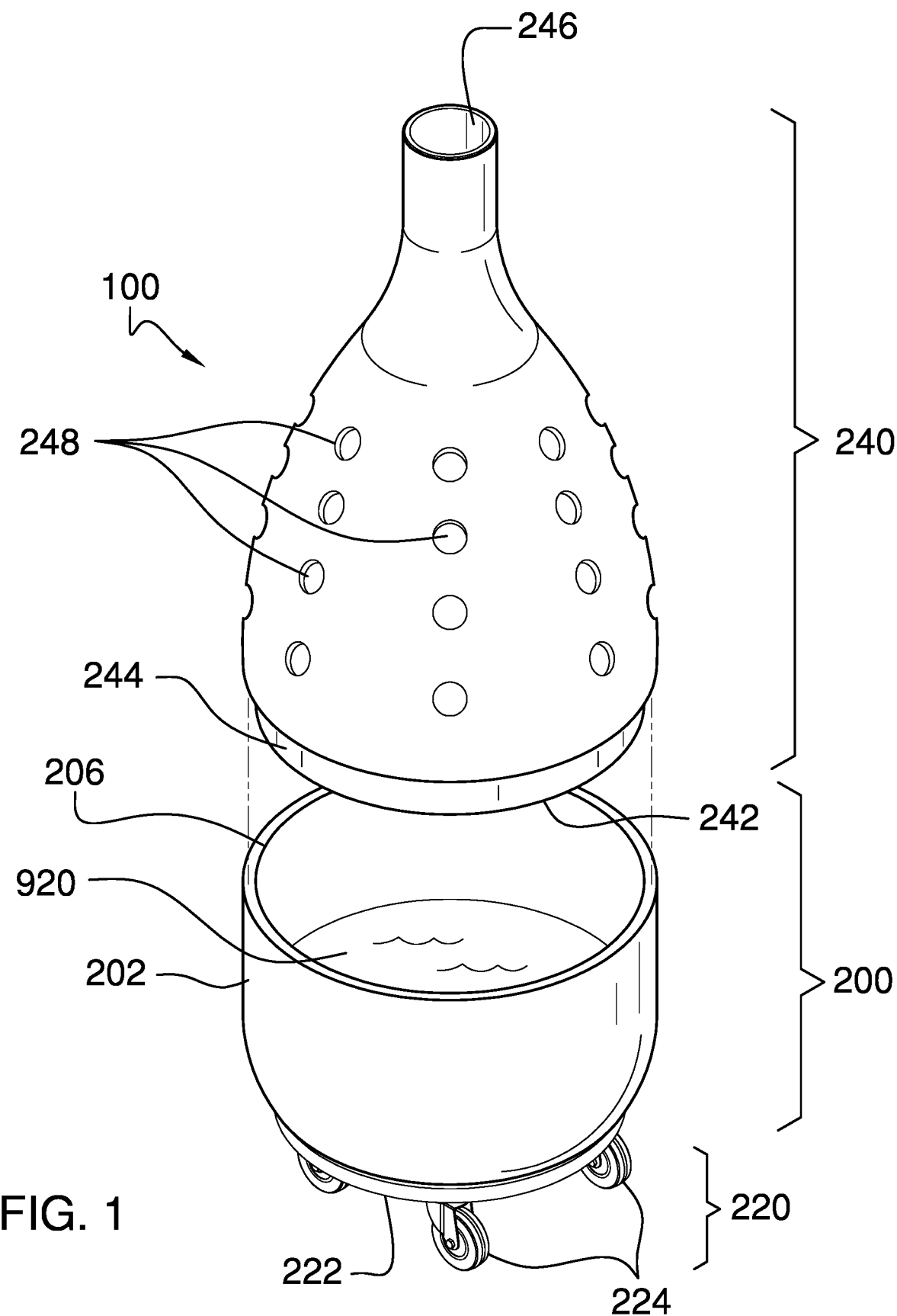
FIG. 1 is an isometric view of an embodiment of the disclosure.
Figure 2:
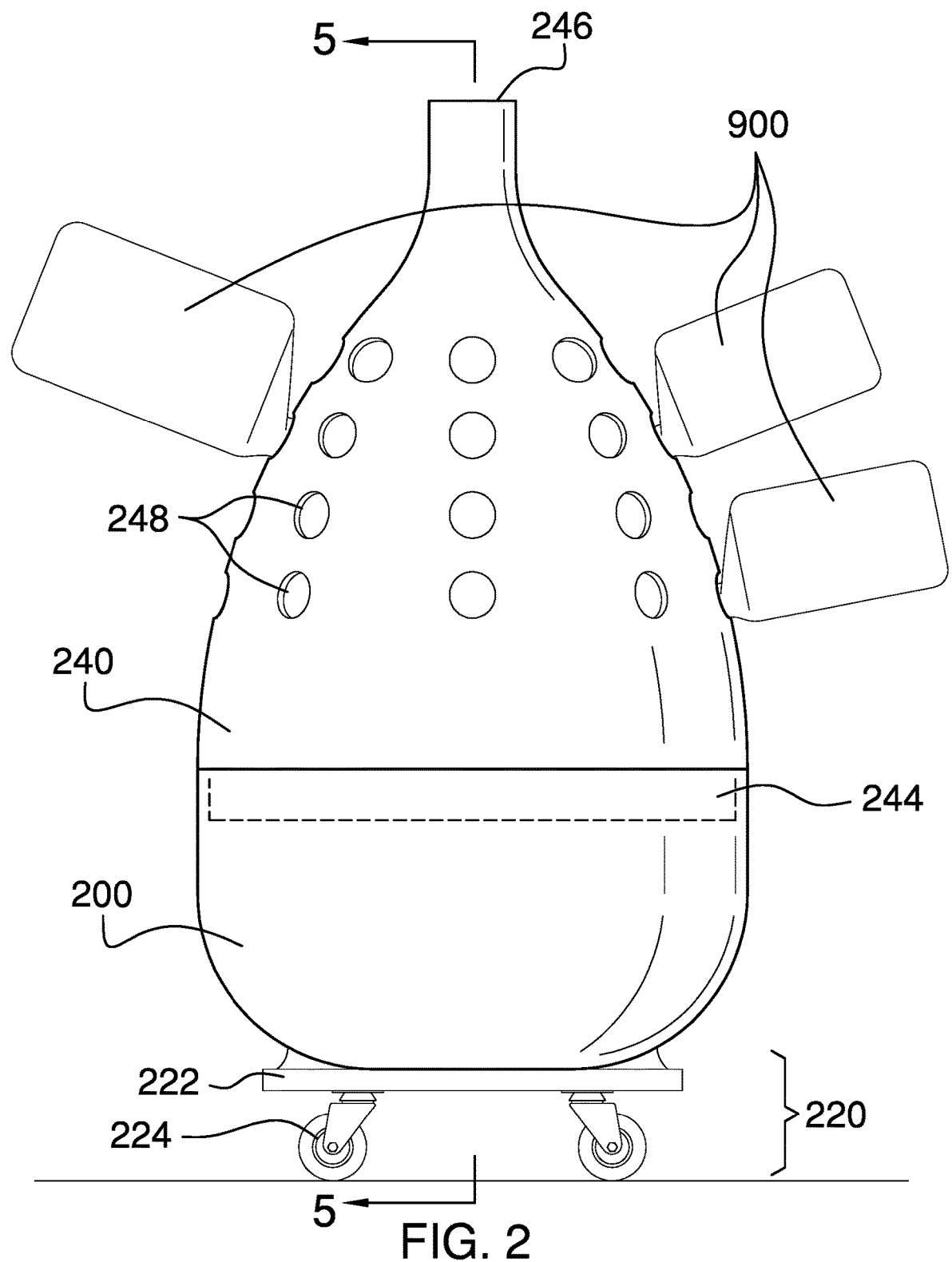
FIG. 2 is a front view of an embodiment of the disclosure.
Figure 3:
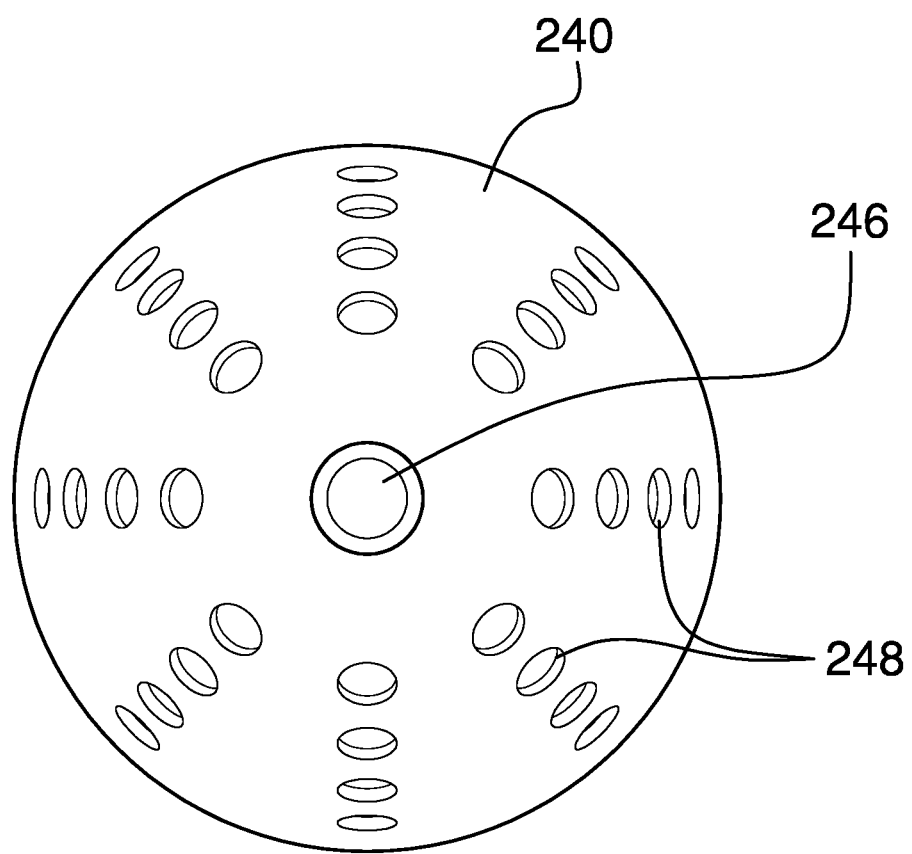
FIG. 3 is a top view of an embodiment of the disclosure.
Figure 4:
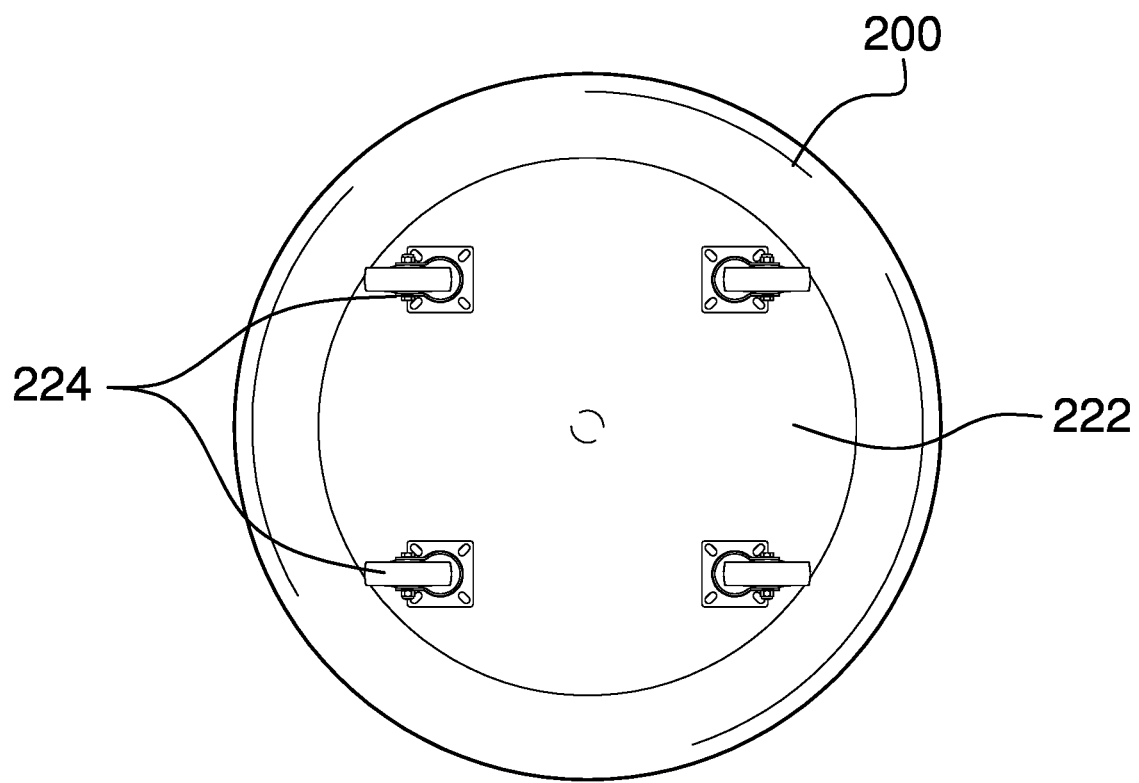
FIG. 4 is a bottom view of an embodiment of the disclosure.
Figure 5:
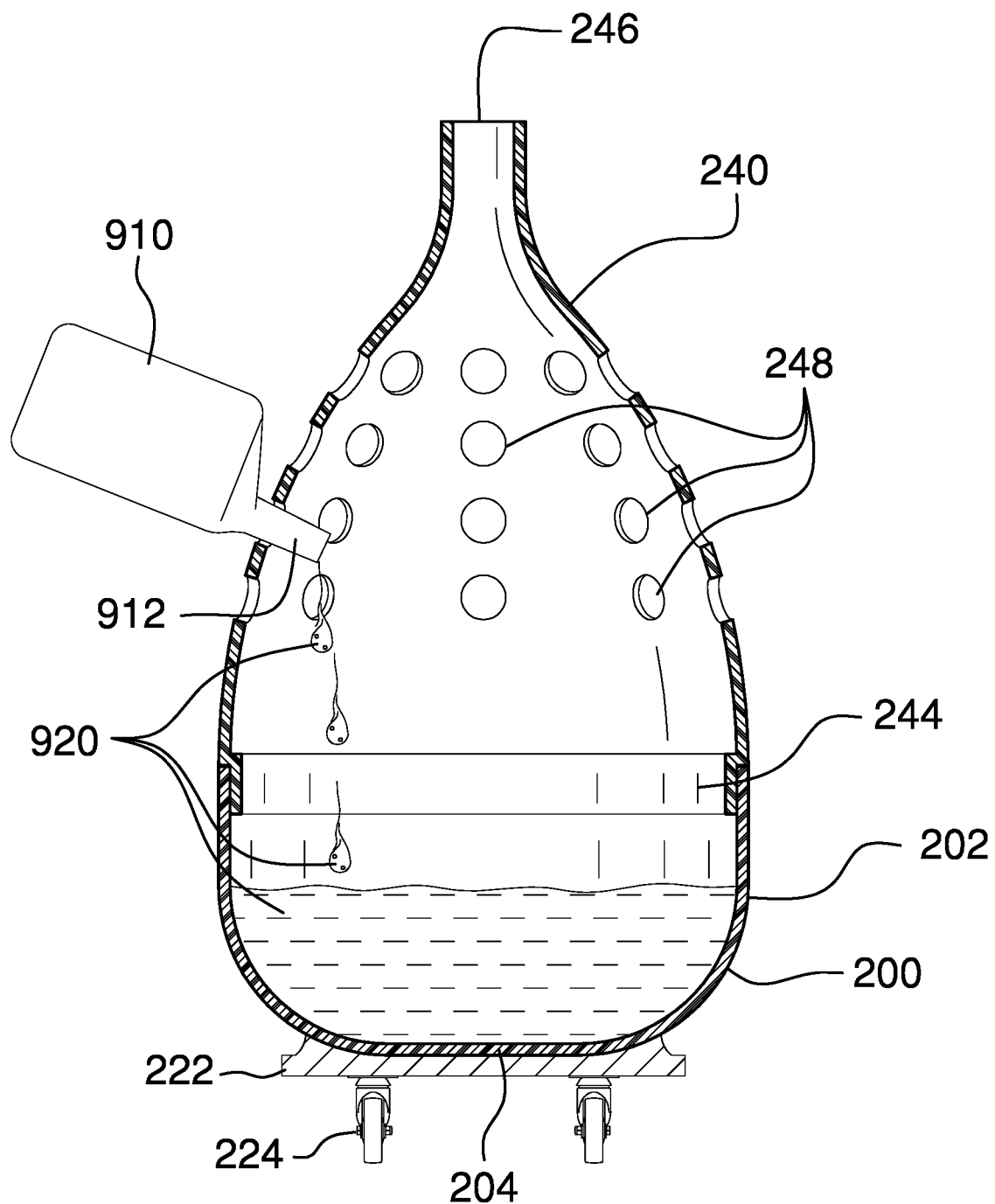
FIG. 5 is a cross-sectional view of an embodiment of the disclosure across 5-5 as shown in FIG. 2.

Detailed reference will now be made to a first potential embodiment of the disclosure, which is illustrated in FIGS. 1 through 5.

The engine oil collection container 100 (hereinafter invention) comprises a collection pan 200 and a perforated cover 240. The invention 100 may be a container for collecting oil 920. One or more emptied oil bottles 900 may be held in an inverted position by a plurality of bottle apertures 248 located on the perforated cover 240 so that residual oil within the one or more emptied oil bottles 900 may drain into the collection pan 200, A top aperture 246 located at the top center of the perforated cover 240 may be operable to collect the oil 920 from a non-bottled oil source. As a non-limiting example, the non-bottled oil source may be an oil collection basin or a vehicle oil pan. In some embodiments, the invention 100 may comprise a rolling stand 220 that is operable to reduce friction between the bottom of the collection pan 200 and the ground when moving the container.

The collection pan 200 may comprise a bottom portion of the container. The collection pan 200 may be bowl-shaped such that the oil 920 may be retained within the collection pan 200. The collection pan 200 may comprise a side wall 202 and a bottom wall 204. The side wall 202 may encircle the collection pan 200 and may couple to the bottom wall 204 around the entire periphery of the bottom wall 204. The collection pan 200 may comprise an open top 206 through which the oil 920 may fall into the collection pan 200.

The perforated cover 240 may hold the one or more emptied oil bottles 900 while the residual oil from the one or more emptied oil bottles 900 drains into the collection pan 200. The perforated cover 240 may detachably couple to the top of the collection pan 200. The perforated cover 240 may have a substantially ogive shape. Specifically, the bottom of the perforated cover 240 may have a diameter that matches the diameter of the top of the collection pan 200 and may narrow as the perforated cover 240 gets taller. The ogive shape may allow the residual oil from an individual emptied oil bottle 910 to drain directly to the collection pan 200 without obstruction from the one or more emptied oil bottles 900 below.

The perforated cover 240 may comprise a bottom aperture to permit the oil 920 to drain from the perforated cover 240 into the collection pan 200. The bottom of the perforated cover may comprise a lip 244 such that the perforated cover 240 may mate with the collection pan 200. In some embodiments, the perforated cover 240 may engage the collection pan 200 such that the perforated cover 240 is secured on the collection pan 200 to retain the oil 920 if the container is tipped. As non-limiting examples, the perforated cover 240 may engage with the collection pan 200 utilizing a friction fit, a twist-lock, or threaded ends on the bottom of the perforated cover 240 and the top of the collection pan 200.

The plurality of bottle apertures 248 may be apertures dispersed over the surface of the perforated cover 240 for inserting the one or more emptied oil bottles 900 into the perforated cover 240. The plurality of bottle apertures 248 may provide a path from the outside of the perforated cover 240 to the inside of the perforated cover 240. The diameter of an individual side aperture selected from the plurality of bottle apertures 248 may be at least as large as the diameter of the individual emptied oil bottle 910. The individual emptied oil bottle 910 may be placed into the individual side aperture such that a neck 912 of the individual emptied oil bottle 910 passes through the individual side aperture. The individual emptied oil bottle 910 may be retained by the individual side aperture. The individual emptied oil bottle 910 may be oriented such that the residual oil within the individual emptied oil bottle 910 may drain through the neck 912 and into the container. The individual emptied oil bottle 910 may be left in place until all of the residual oil has drained.

The top aperture 246 may be a vertically oriented aperture located at the top center of the perforated cover 240. The top aperture 246 may have a diameter that is larger than the diameter of the plurality of bottle apertures 248 to ease the task of pouring the oil 920 into the top aperture 246.

In some embodiments, the invention 100 may comprise the rolling stand 220. The rolling stand 220 may be a rolling carrier for the container. The rolling stand 220 may be adapted to transport the container under control of a user. The rolling stand 220 may comprise a pan receiver 222 and a plurality of wheels 224. The pan receiver 222 may be a platform upon which the collection pan 200 may be placed. In some embodiments, the top of the pan receiver 222 may be contoured to match the shape of the bottom of the collection pan 200. In some embodiments, the rolling stand 220 may detach from the collection pan 200. The plurality of wheels 224 may be caster wheels attached to the underside of the pan receiver 222. In some embodiments, two or more of the plurality of wheels 224 may swivel.

In some embodiments, the collection pan 200 may have a capacity of 5 to 10 gallons. The capacity of the collection pan may be established by the diameter of the bottom wall 204, by the height of the side wall 202, or both.

In use, a user may change oil in a vehicle engine. After refilling the vehicle's crankcase, one or more emptied oil bottles 900 may contain residual oil. The user may place the one or more emptied oil bottles 900, with their caps removed, into a plurality of bottle apertures 248 on a perforated cover 240 of the invention 100 and allow the residual oil from within the one or more emptied oil bottles 900 to drain into a collection pan 200 located at the bottom of the invention 100. The user may leave the one or more emptied oil bottles 900 on the invention 100 for long periods of time to assure that the one or more emptied oil bottles 900 are completely drained. Oil 920 collected in the collection pan 200 may be used or recycled.

In some usage scenarios, the user may pour the oil 920 from a non-bottled oil source into a top aperture 246 of the perforated cover 240. As a non-limiting example, the non-bottled oil source may be an oil collection basin from a different oil change.

Although this disclosure has described the invention 100 in terms of collecting engine oil, the invention 100 may also be used to collect transmission fluid, hydraulic fluid, or other viscous fluids.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

As used in this disclosure, a "bottle" may be a container used for the storage of fluids. Access to the interior of a bottle is gained through the neck of the bottle. The neck is an elongated tube that forms an aperture through which fluids can be introduced and removed from the bottle.

As used in this disclosure, a "caster" may be a housing that includes a wheel. A caster may be mounted to the bottom of a device to enable movement of the device with reduced friction. In some embodiments, a caster may comprise a swivel that allows the wheel to adjust, or swivel, the direction of rotation of the wheel to the direction of motion desired for the wheel.

As used herein, the words "couple", "couples", "coupled" or "coupling", may refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used herein, the term "friction fit" may refer to a type of mechanical coupling where a first component presses into a second component and is held there only by the friction of the first component against the second component. A friction fit may also be known as an interference fit or a press fit.

As used herein, the words "invert", "inverted", or "inversion" refer to an object that has been turned inside out or upside down or to the act of turning an object inside out or upside down.

As used herein, "mate" may refer to a retaining, coupling, connecting, interlocking, or interfacing at a predefined interface.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An engine oil collection container comprising: a collection pan and a perforated cover; wherein the engine oil collection container is a container for collecting oil; wherein one or more emptied oil bottles are held in an inverted position by a plurality of bottle apertures located on the perforated cover so that residual oil within the one or more emptied oil bottles drain into the collection pan; wherein a top aperture located at a top center of the perforated cover is operable to collect the oil from a non-bottled oil source.

2. The engine oil collection container according to claim 1
    wherein the collection pan comprises a bottom portion of the container;
    wherein the collection pan is bowl-shaped such that the oil is retained within the collection pan.

3. The engine oil collection container according to claim 2 wherein the collection pan comprises a side wall and a bottom wall; wherein the side wall encircles the collection pan and couples to the bottom wall around an entire periphery of the bottom wall.

4. The engine oil collection container according to claim 3
    wherein the collection pan comprises an open top through which the oil falls into the collection pan.

5. The engine oil collection container according to claim 4
    wherein the perforated cover holds the one or more emptied oil bottles while the residual oil from the one or more emptied oil bottles drains into the collection pan.

6. The engine oil collection container according to claim 5
    wherein the perforated cover detachably couples to the top of the collection pan.

7. The engine oil collection container according to claim 6 wherein the perforated cover has a substantially ogive shape; wherein the bottom of the perforated cover has a diameter that matches a diameter of the top of the collection pan and narrows as the perforated cover gets taller.

8. The engine oil collection container according to claim 7
    wherein the perforated cover comprises a bottom aperture to permit the oil to drain from the perforated cover into the collection pan;
    wherein the bottom of the perforated cover comprises a lip such that the perforated cover mates with the collection pan.

9. The engine oil collection container according to claim 8
    wherein the perforated cover engages the collection pan such that the perforated cover is secured on the collection pan to retain the oil if the container is tipped.

10. The engine oil collection container according to claim 9 wherein the plurality of bottle apertures are apertures dispersed over the surface of the perforated cover for inserting the one or more emptied oil bottles into the perforated cover; wherein the plurality of bottle apertures provide a path from the outside of the perforated cover to the inside of the perforated cover; wherein a diameter of an individual side aperture selected from the plurality of bottle apertures is at least as large as a diameter of an individual emptied oil bottle.

11. The engine oil collection container according to claim 10
    wherein the individual emptied oil bottle is placed into the individual side aperture such that a neck of the individual emptied oil bottle passes through the individual side aperture;
    wherein the individual emptied oil bottle is retained by the individual side aperture;
    wherein the individual emptied oil bottle is oriented such that the residual oil within the individual emptied oil bottle drains through the neck and into the container.

12. The engine oil collection container according to claim 11 wherein the top aperture is a vertically oriented aperture located at the top center of the perforated cover; wherein the top aperture has a diameter that is larger than the diameter of the individual side aperture selected from the plurality of bottle apertures.

13. The engine oil collection container according to claim 12
    wherein the engine oil collection container comprises a rolling stand;
    wherein the rolling stand is a rolling carrier for the container;
    wherein the rolling stand is adapted to transport the container under control of a user.

14. The engine oil collection container according to claim 13
    wherein the rolling stand comprises a pan receiver and a plurality of wheels;
    wherein the pan receiver is a platform upon which the collection pan is placed.

15. The engine oil collection container according to claim 14
    wherein the top of the pan receiver is contoured to match the shape of the bottom of the collection pan.

16. The engine oil collection container according to claim 14 wherein the rolling stand detaches from the collection pan.

17. The engine oil collection container according to claim 16 wherein the plurality of wheels are caster wheels attached to the underside of the pan receiver.

18. The engine oil collection container according to claim 17 wherein two or more of the plurality of wheels swivel.

19. The engine oil collection container according to claim 16 wherein the collection pan has a capacity of 5 to 10 gallons.

20. The engine oil collection container according to claim 16 wherein the capacity of the collection pan is established by a diameter of the bottom wall, by a height of the side wall, or both.

\* \* \* \* \*